US011428890B2

(12) United States Patent
Smalley

(10) Patent No.: US 11,428,890 B2
(45) Date of Patent: Aug. 30, 2022

(54) ROOM-SIZED HOLOGRAPHIC VIDEO

(71) Applicant: Brigham Young University, Provo, UT (US)

(72) Inventor: Daniel Smalley, Provo, UT (US)

(73) Assignee: Brigham Young University, Provo, UT (US)

( * ) Notice: Subject to any disclaimer, the term of this patent is extended or adjusted under 35 U.S.C. 154(b) by 160 days.

(21) Appl. No.: 16/353,787

(22) Filed: Mar. 14, 2019

(65) Prior Publication Data

US 2019/0212518 A1   Jul. 11, 2019

Related U.S. Application Data

(63) Continuation-in-part of application No. 16/222,761, filed on Dec. 17, 2018, now abandoned, which is a continuation-in-part of application No. 16/140,226, filed on Sep. 24, 2018, now abandoned, application No. 16/353,787, which is a continuation-in-part of application No. 16/140,226, filed on Sep. 24, 2018, now abandoned, which is a continuation of application No. 16/032,918, filed on Jul. 11, 2018, now abandoned, which is a continuation of application No. 15/955,683, filed on Apr. 17, 2018, now abandoned.

(60) Provisional application No. 62/486,279, filed on Apr. 17, 2017.

(51) Int. Cl.
| G02B 26/08 | (2006.01) |
| G02B 7/00 | (2021.01) |
| G02B 26/12 | (2006.01) |
| G02B 26/10 | (2006.01) |

(52) U.S. Cl.
CPC ........... *G02B 7/005* (2013.01); *G02B 26/105* (2013.01); *G02B 26/127* (2013.01)

(58) Field of Classification Search
CPC ............ B81B 3/0043; B81B 2203/053; B81B 2203/058; B81B 2201/032; B81B 2201/042; G02B 26/0833; G02B 26/0866; G02B 26/0841
USPC ....................................... 359/205.1
See application file for complete search history.

(56) References Cited

U.S. PATENT DOCUMENTS 9,176,319 B2 *  11/2015  Bouma .................... G01J 3/021
2018/0046140 A1 *  2/2018  Smithwick ........... G02B 26/106

* cited by examiner

*Primary Examiner* — Euncha P Cherry
(74) *Attorney, Agent, or Firm* — Strong & Hanni, P.C.; Joseph Shapiro

(57) ABSTRACT

A method and system are disclosed for using circular symmetry to eliminate the angle limitations of an optical axis in a scanned aperture holography system. A Room-sized Holography System may be a scanned aperture holographic video display and may comprise a rotating platform, a telescope comprising a first lens and a second lens, and scanners at the Fourier plane where the focal length of the first lens and the second lens meet. The platform may rotate around an axis aligned with a spatial light modulator. When the platform rotates, the scanners rotate, thereby de-rotating a SAW image. The second lens may be a spherical reflective surface for redirecting light from the spatial light modulator, having passed through the first lens and reflected off a mirror-scanner, toward a user's eyes. The user may be on a chair above the spatial light modulator, wherein the chair is configured to rotate with the spatial light modulator.

20 Claims, 6 Drawing Sheets

400

```
┌─────────────────────────────────┐
│ Spatial light modulator 140     │
│ receives and/or processes input,│
│ and outputs light 190           │
│                            410  │
└─────────────────────────────────┘
                ↓
┌─────────────────────────────────┐
│ Light 190 passes through first  │
│ lens 150 and possibly through   │
│ optics 155                      │
│                            412  │
└─────────────────────────────────┘
                ↓
┌─────────────────────────────────┐
│ Light 190 reflects off mirror   │
│ 120a                            │
│                            414  │
└─────────────────────────────────┘
                ↓
┌─────────────────────────────────┐
│ Mirror 120 is optionally        │
│ adjusted using solenoids 125a   │
│ and 126a                        │
│                            416  │
└─────────────────────────────────┘
                ↓
┌─────────────────────────────────┐
│ Light 190 reflects off second   │
│ lens 160 and is redirected      │
│ toward eyes 171 of user 170     │
│                            418  │
└─────────────────────────────────┘
                ↓
┌─────────────────────────────────┐
│ Light 190 optionally passes     │
│ through vertical diffuser 200   │
│                            420  │
└─────────────────────────────────┘
```

FIG. 4

ROOM-SIZED HOLOGRAPHIC VIDEO

BACKGROUND OF THE INVENTION

Note that the world 'lens' is used broadly to include refractive and reflective structures with a focal length in at least one dimension.

A scanned aperture holographic video display comprises a telescope made of two lenses and a scanner at the Fourier plane where the focal length of those two lenses meet. Such systems are typically limited in angle by the optical axis of the lenses comprising the telescope, with lenses accepting rays from a small angular cone often less than 30 degrees from the central axis. "Paraxial rays," i.e., rays at higher angles, are problematic because higher angle rays are more susceptible to aberration. The scanner in such a system is usually a small polygon that the user looks at from the outside.

FIG. 6 shows an exemplary scanned aperture holographic video display comprising first lens 610, second lens 620, scanner 630, and SAW 650. The exemplary scanned aperture holographic video display shown in FIG. 6 generally comprises an acousto-optic modulator. The modulator usually has a small aperture (e.g. 10 mm) and usually can only diffract light over a small range of angles (e.g. 15 degrees). The target view angle for holographic video is often above 30 degrees. The modulator is imaged through an inverted telescope made of two lenses that share a focal length. The lenses may have different focal lengths and diameters. They may be refractive or reflective. If the second focal length is shorter than the first the image of the modulator will be demagnified. The aperture size will be decreased and the angle will be increased by approximately the same factor. For example, a second focal length that is half the length of the first focal length would result in a modulator image that was half as large (5 mm instead of 10 mm) with twice the angular range (30 degrees instead of 15 degrees).

What is needed is an improved holographic display system to mitigate and/or eliminate the angle limitations of an optical axis in a scanned aperture holography system.

BRIEF SUMMARY OF THE INVENTION

A Room-sized Holography System may use circular symmetry to eliminate the angle limitations of an optical axis in a scanned aperture holography system. The Room-sized Holography System may be a scanned aperture holographic video display and may comprise a rotating platform, a telescope comprising a first lens and a second lens, and scanners at the Fourier plane where the focal length of the first lens and the second lens meet.

The platform may be configured to rotate around an axis aligned with a spatial light modulator. When the platform rotates, the scanners rotate, thereby derotating the SAW image. A mirror may turn to descan the image.

The second lens may be a spherical reflective surface. The scanners may be a large polygon. A spatial light modulator may be located at the center of the polygon scanners.

The spatial light modulator may be secured to the rotating platform, which may be secured to a chair or other structure or device that rotates a user. The spatial light modulator may track the angular position of the chair.

The scanners, which are shaped as a large polygon, may comprise an array of moving mirrors positioned so that the distance from the mirrors to the first lens is half the radius of the spherical second lens. This distance is the location of the Fourier plane of the second lens.

Each mirror may be horizontally perpendicular to a light path originating from the spatial light modulator and the first lens. By vertical orientation, each mirror is oriented at a 45-degree angle relative to the light path, so that the light is directed vertically upward toward a reflection point on the second lens, which directs the light path toward the eyes of a user sitting in the chair.

The user may swivel or rotate the chair to view all angles of the generated holographic video.

An exemplary method comprises a spatial modulator receiving input, processing the input, and outputting the input as light in a light path that passes through the first lens, reflects off a mirror toward the second lens, and is redirected toward a user's eyes.

BRIEF DESCRIPTION OF THE DRAWINGS

FIG. 4 is a flowchart showing an exemplary method for creating a room-sized holographic display.

DETAILED DESCRIPTION OF THE INVENTION

This Application claims priority to and is a continuation-in-part of U.S. Nonprovisional patent application Ser. No. 16/222,761 titled "Room-Sized Holographic Video" and filed on Dec. 17, 2018, which claims priority to and is a continuation-in-part of U.S. Nonprovisional patent application Ser. No. 16/140,226 titled "Room-Sized Holographic Video" and filed on Sep. 24, 2018, which claims priority as a continuation of U.S. Nonprovisional patent application Ser. No. 16/032,918 titled "Room-Sized Holographic Video" and filed on Jul. 11, 2018, which claims priority as a continuation to U.S. Nonprovisional patent application Ser. No. 15/955,683 titled "Room-Sized Holographic Video" and filed on Apr. 17, 2018, which claims priority to U.S. Provisional Application No. 62/486,279 titled "Room-sized Holographic Video," and filed on Apr. 17, 2017. All of the referenced priority applications are incorporated herein by reference in their entirety.

A system and method are disclosed for room-sized holography.

TABLE OF REFERENCE NUMBERS FROM DRAWINGS

The following table is for convenience only and should not be construed to supersede any potentially inconsistent disclosure herein.

| Reference Number | Description |
|---|---|
| 100 | Room-sized Holography System |
| 110 | platform |
| 112 | platform support |
| 114 | platform support |
| 120a-n | mirrors/scanner |
| 121a-n | mirror supports |
| 125a-n | first adjustment solenoids |
| 126a-n | second adjustment solenoids |
| 130 | direction of platform rotation |
| 140 | spatial light modulator |
| 145 | direction of rotation of spatial light modulator |
| 147 | mounting/rotating platform |
| 150 | first lens |
| 155 | optics |
| 160 | second lens |
| 162 | reflection point on second lens |
| 170 | user |
| 171 | user's eyes |
| 173 | chair |
| 175 | direction of chair rotation/swivel |
| 180 | first angle |
| 182 | second angle |
| 190 | light path |
| 200 | optional optics |
| 400 | flowchart for exemplary method for creating a room-sized holographic display |
| 410 | step in method 400 |
| 412 | step in method 400 |
| 414 | step in method 400 |
| 416 | step in method 400 |
| 418 | step in method 400 |
| 420 | step in method 400 |
| 510 | rotating reflecting mirror |
| 600 | scanner aperture holography system |
| 610 | first lens |
| 620 | second lens |
| 630 | scanner |
| 650 | SAW |

The Room-sized Holography System disclosed herein uses circular symmetry to eliminate the angle limitations of an optical axis in a scanned aperture holography system.

Figure 1:
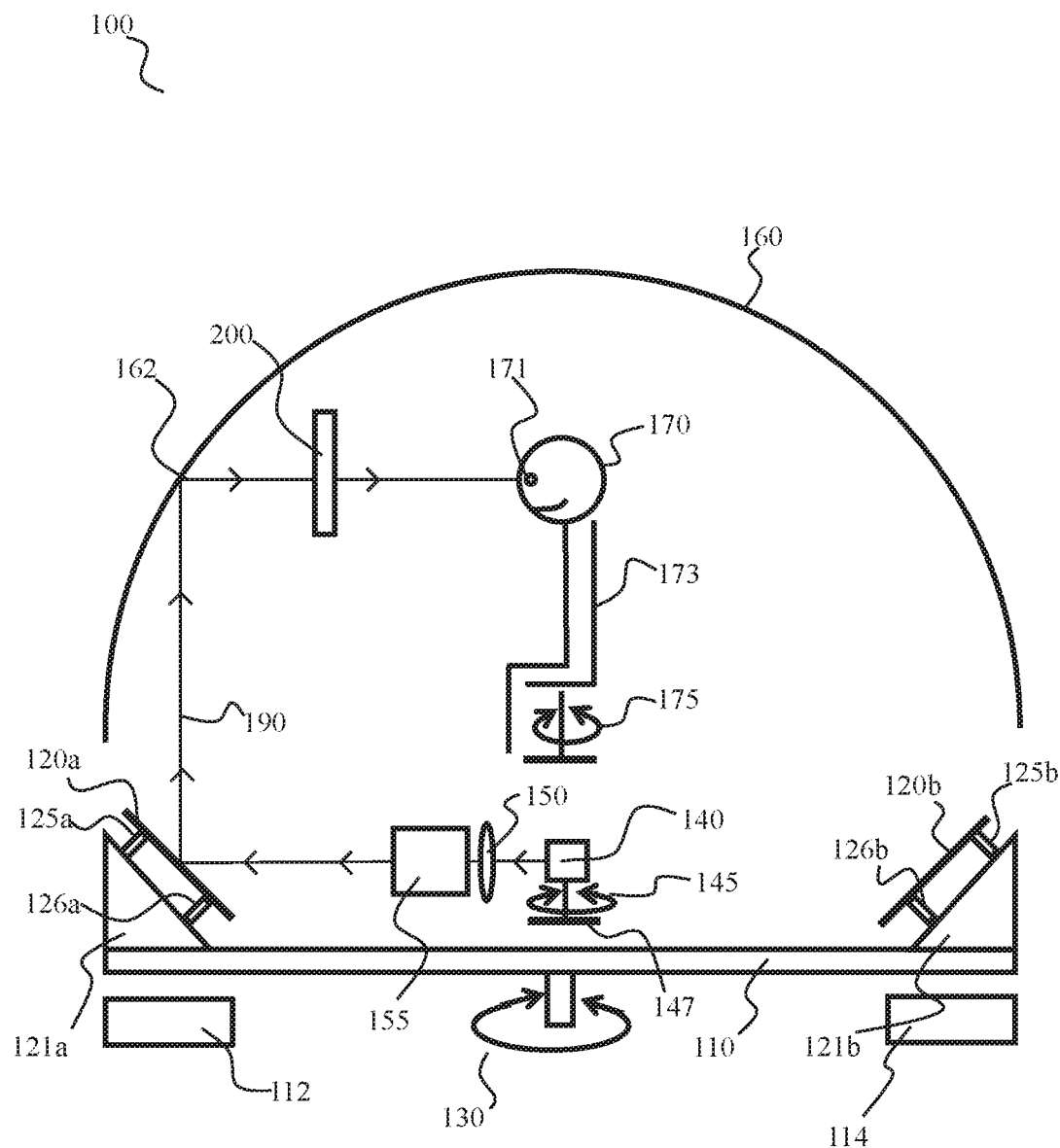
FIG. 1 illustrates a side cross-section view of an exemplary embodiment of the Room-sized Holography System disclosed herein.
Figure 2:
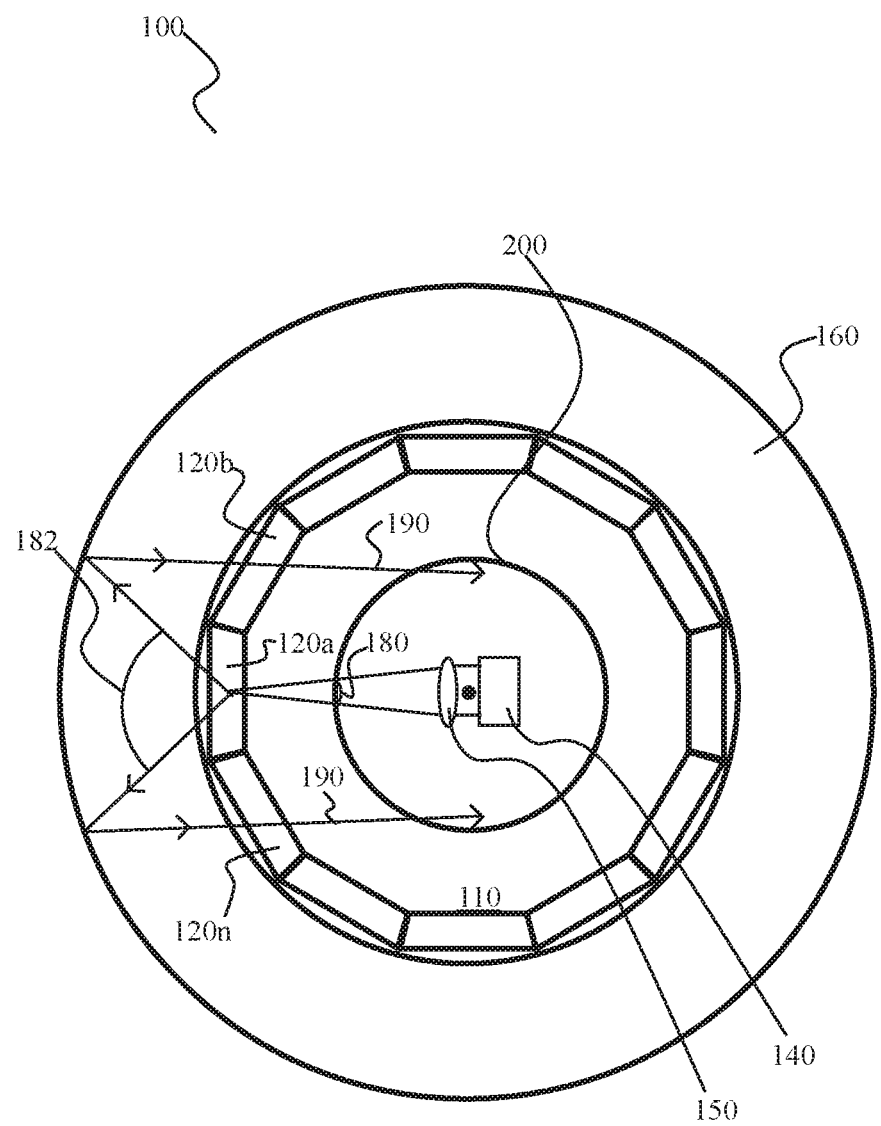
FIG. 2 shows a top view of an exemplary embodiment of the Room-sized Holography System disclosed herein.

As shown in FIGS. 1 and 2, Room-sized Holography System 100 may be a scanned aperture holographic video display. Room-sized Holography System 100 may comprise a platform 110, a telescope made of a first lens 150 and a second lens 160, and a scanner 120*a-n* at the Fourier plane where the focal length of those two lenses meet.

Platform 110 may be any platform or stable structure configured to rotate (e.g., in direction 130) around an axis aligned with spatial light modulator 140. In one embodiment, platform 110 may be supported, in whole or in part, by supports 112 and 114, which may be a low friction surface to support the rotating platform 110. Supports 112 and 114 may comprise an air cushion surface with holes emitting air to facilitate low-friction rotation of platform 110. Platform 110 may rotate in either direction. When platform 110 rotates, the scanners (mirrors) rotate, thereby derotating the SAW image. The mirror turns to descan the image.

In one embodiment, first lens 150 may be a small, e.g., 50 mm diameter, lens with a focal length of approximately one-half the radius of the large reflective circle lens, i.e., second lens 160. In this example the focal lengths are equal but optics could be added (e.g. a bravais system) to make the effective focal length much longer for first lens 150. Second lens 160 may be a circular lens that has no axis but instead is circularly symmetric.

Scanner 120*a-n* may be a large polygon that a user looks at from the inside as scanner 120*a-n* spins or rotates.

A spatial light modulator 140 may be located at the center of the large polygon, i.e., scanner 120*a-n*. Being positioned at the center of the large polygon, i.e., scanner 120*a-n*, enables exploitation of circular symmetry.

In an alternate embodiment, instead of positioning one spatial light modulator at the center of the large polygon, an array of spatial light modulators could be positioned around the perimeter of scanner 120*a-n* and oriented to emit inward toward a moving, i.e, rotating—but not necessarily at the same rate as the user-mirror located under user 170 at center of scanner 120*a-n*.

Spatial light modulator 140 may be positioned other than under user 170, as long it is not in the field of vision of user 170. Spatial light modulator 140 could therefore be placed under user 170, above user 170, in front of user 170, or in another location as long as spatial light modulator 140 is not within user 170's field of vision, i.e., is not obstructing light from second lens 160.

Spatial light modulator 140 may be an array of leaky mode modulator channels, which may be paired for large angular sweep. The leaky mode modulator channels may be combined with other arrays for full color, e.g., with a color combiner cube.

Spatial light modulator 140 may be configured to modulate some number of lines of the final display output that pass through first telescope lens 150 and possibly some other optics 155 (as shown in FIG. 1), e.g., a polarizer to filter noise or a bravais system to make the source appear further away and to increase the magnification factor of the telescope.

As shown in FIG. 1, spatial light modulator 140 may be mounted and/or secured to mounting/rotating platform 147, which may be mechanically secured to chair 173, or may be otherwise configured to rotate in the same direction and at the same rotational speed as user 170 rotates in chair 173, or at a fixed fraction of the rotational speed of rotation of chair 173 and/or user 170. In general, the spatial modulator orientation tracks the angular position of the chair.

As shown in FIGS. 1 and 2, scanner 120*a-n*, which is shaped as a large polygon, comprises an array of moving mirrors 120*a-n*, which are positioned such that the distance from mirrors 120*a-n* to first lens 150 is half the radius of second telescope lens 160 if second telescope lens 160 is circularly shaped. This distance, i.e., half the radius of second telescope lens 160, is the location of the Fourier plane of second telescope lens 160 for a circularly-shaped second lens.

Each mirror 120*n* is horizontally perpendicular to light path 190 originating from spatial light modulator 140 and first lens 150. In its vertical orientation, each mirror 120*n* is oriented at a 45-degree angle relative to light path 190, so that light path 190 is directed vertically upward toward a reflection point 162 on second lens 160, as shown in FIG. 1. In general, the vertical angle at reflection point 162 is such that light path 190 is redirected toward user 170. Additionally, each mirror 120*n* may be oriented at an angle other than 45 degrees as long as light path 190 is directed toward reflection point 162 and then toward user eyes 171. The light may approach the user at any angle, i.e., the light does not have to approach the user horizontally.

As shown in FIG. 1, second lens 160 may be a spherically shaped reflective surface that acts as an output reflector lens. The shape of second lens 160 may alternatively be parabolic, ellipsoidal, conical, cylindrical, or ovoidal (e.g., paraboloid, oval, hyperboloid). Second lens 160 may alternatively be broken into four adjacent and cardinally-oriented parabolas. In one embodiment, second lens 160 may have curvature of a circle with a radius 1.0 meters or 2.0 meters. These dimensions are exemplary and may be scaled within the scope of the disclosure herein. The surface of second lens 160 may be made of a reflective material such as reflective mylar. In general, many reflective materials known in the art may be used.

In one embodiment, second lens 160 may be a cone, or a cylinder using a cylindrical beamsplitter, or a segment/cross-section of a one of the shapes or structures described herein, wherein the segment comprises at least the part necessary for interacting with light path 190.

Each mirror 120n in the array of mirrors 120a-n functions as the facet of a polygon scanner, scanning the output of the modulator, i.e., derotating the image of the moving pattern from spatial light modulator 140.

As shown in FIG. 1, mirror 120n may be adjusted, e.g., by aiming and tilting. In one embodiment, solenoids 125a and 126a on mounting support 126a may be used to adjust mirror 120a. Lasers and detectors may be used as inputs for mirror adjusting, to keep the mirrors precisely aligned as the mirrors spin. Alignment is important to ensure that light path 190 is directed toward eyes 171 of user 170 from reflection point 162.

Scanning mirrors 120a-n derotate the leaky mode devices in the spatial light modulator and direct light 190 from the leaky mode devices to a large second lens 160, i.e., the large circular output reflector, which redirects light 190 to eyes 171 of user 170.

Figure 3:
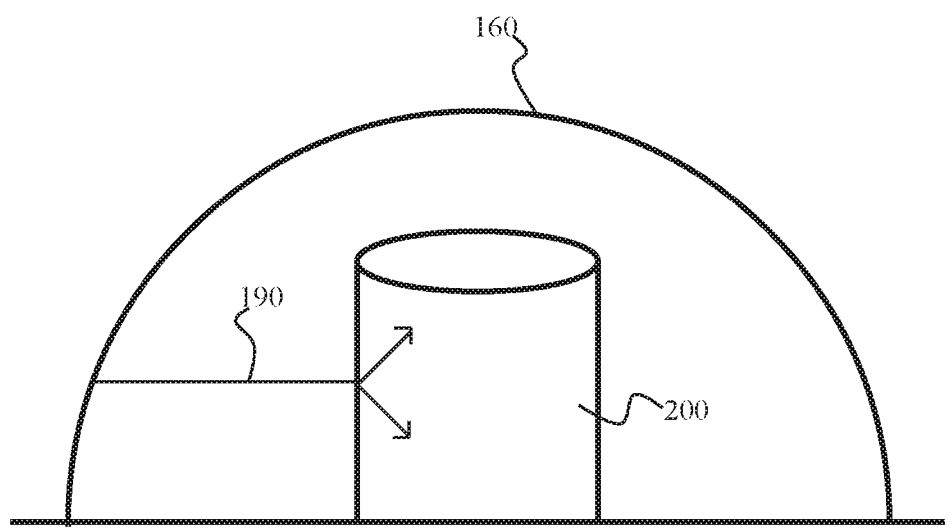
FIG. 3 shows a side cross section view of an exemplary embodiment of a room-sized holography system using a diffuser.

In one embodiment, optional optics 200 may be located between reflection point 162 and eyes 171 of user 170. Optional optics may comprise a vertical diffuser and/or polarizer, and may be configured to increase the view zone vertically FIGS. 1, 2, 3, and 5 show optional optics 200. For example, as shown in FIG. 3, optional optics may be a vertical diffuser. As shown in FIG. 3, vertical diffuser 200 may vertically diffuse light 190. Additionally, an optional beamsplitter may be co-located, or located near, optional optics 200. The beamsplitter and/or polarizer could rotate with the user, be fixed and circular, and/or be circular with facets.

In one embodiment, user 170 may sit in a swiveling chair 173 that the user may rotate, or that may be rotated other than by the user, so that the user is able to view all angles, aspects, sides, and parts of the generated holographic video. Chair 173 may be rotated in either direction 175. In general, the chair may be configured to swivel at the center of the polygon formed by mirrors 120a-n.

Chair 173 is not absolutely necessary, but it serves the purpose of maintaining a fixed position for user 170 in the center of Room-sized Holography System 100, and also keeping eyes 171 of user 170 at a fixed elevation. A vertical-only diffuser makes vertical elevation much less important.

In one embodiment, as shown in FIG. 1, spatial light modulator 140 may be located beneath swivel chair.

In one embodiment, mirrors 120a-n are flat, although mirrors 120a-n may be curved such that the distance from lens 150 to mirror 120n remains constant as spatial light modulator 140 spins.

In a preferred embodiment, first lens 150 and optics 155 maintain a fixed position and orientation relative to spatial light modulator 140. In other words, when spatial light modulator 140 rotates, first lens 150 and optics 155 rotate around the same axis around which spatial light modulator is rotating, and also rotate at the same rotational speed at which spatial light modulator 140 is rotating. In one embodiment, first lens 150 and optics 155 may be directly or indirectly mechanically secured to spatial light modulator 140. In an alternate embodiment, first lens 150 and/or optics 155 may be mechanically independent from spatial light modulator 140 but may be otherwise configured, e.g., with an independent motor system, to move and rotate in conjunction with spatial light modulator 140.

In one embodiment, first lens 150 and other optics 155 rotate in conjunction with spatial light modulator 140, and may be mechanically secured to spatial light modulator 140.

Figure 5:
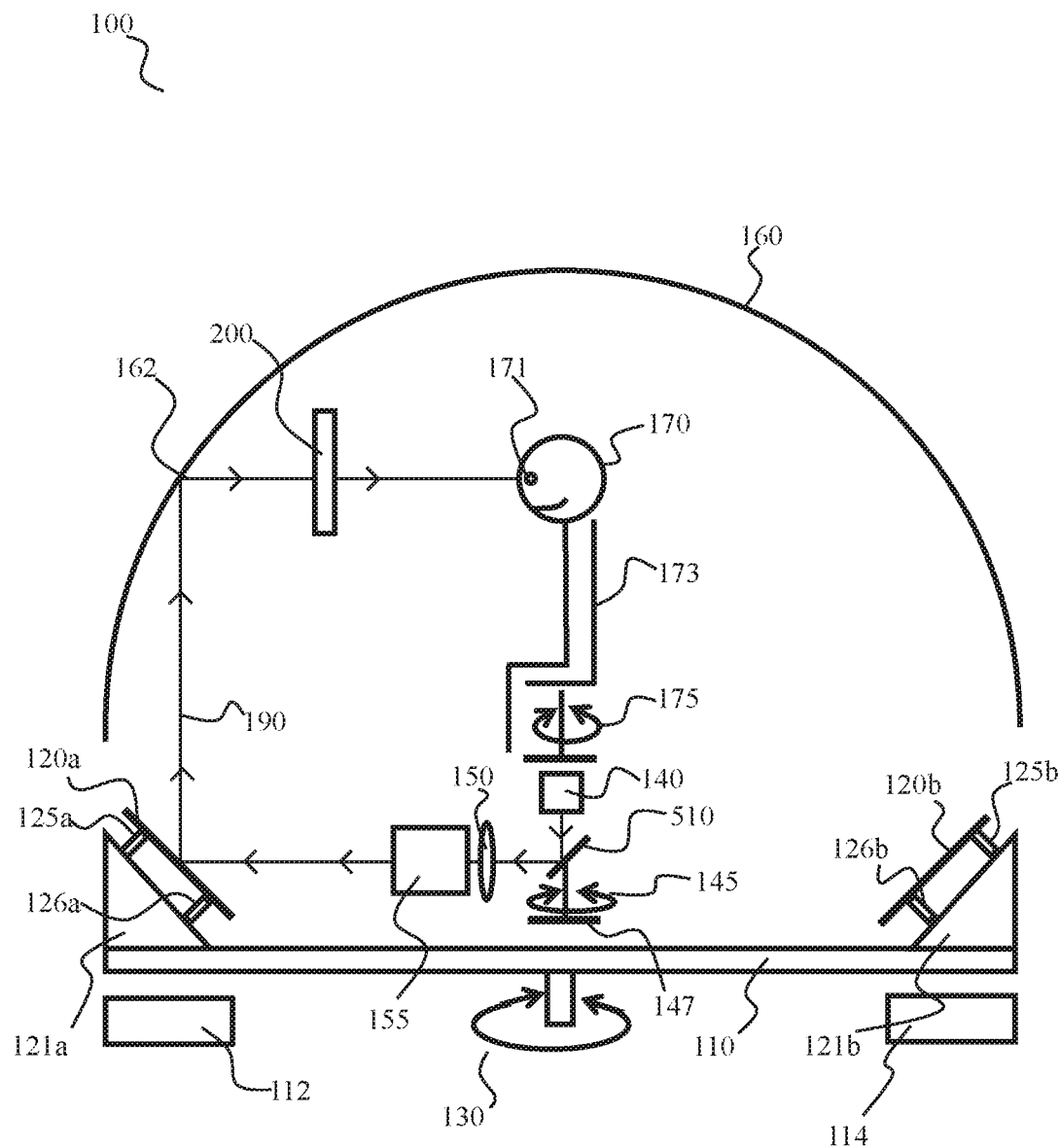
FIG. 5 illustrates a side cross-section view of an exemplary embodiment of a Room-sized Holography System in which the spatial light modulator is placed above a rotating mirror that redirects light from the center of a first lens.
Figure 6:
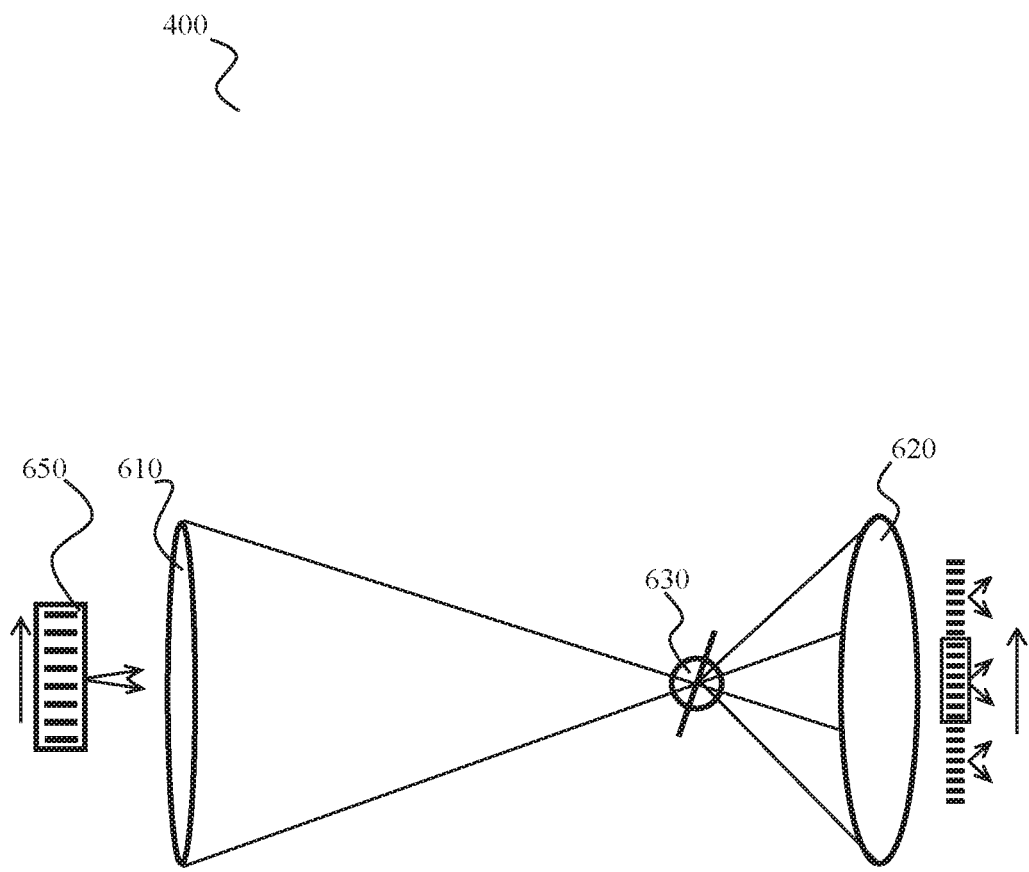
FIG. 6 shows an exemplary scanned aperture holographic video display as known in the prior art.

In an alternate embodiment, as shown in FIG. 5, spatial light modulator 140 may be placed above a rotating mirror 510 that may redirect light 190 from the center of first lens 150.

In another alternative embodiment, Room-sized Holography System 100 may include multiple or numerous spatial light modulators directed in many directions so that the spatial light modulator does not have to pivot.

As will be understood by a person of ordinary skill, the dimensions and other features of the Room-sized Holography System disclosed herein may be scaled without departing from the disclosure herein In one embodiment, as shown in FIG. 4, an exemplary method for providing room-sized holography may comprise the following steps.

At step 410, spatial light modulator may receive input, may process such input, and may output such input as light 190.

At step 412, light 190 may pass through first lens 150 and possibly through optics 155.

At step 414, light 190 may reflect off mirror 120a as shown in FIG. 1.

At step 416, mirror 120 may be optionally adjusted, if necessary, using solenoids 125a and 126a.

At step 418, light 190 may reflect off second lens 160 and be redirected toward user eyes 171.

At step 420, light 190 may optionally pass through vertical diffuser 200.

During the process described above, mirror 120a may optionally be adjusted using solenoids 125a and 126a or using some other adjustment mechanism. Further, chair 173 may be rotated either direction.

The system described herein may be adapted for any type of spatial light modulator (e.g., MEMs device, LCD, bulk-wave acousto-optic modulator), but the preferred embodiment as described herein is a leaky mode spatial light modulator because of its high potential bandwidth-sufficient to supply a room-size display.

What is claimed is:

1. A scanned aperture holographic video system comprising:
    a spatial light modulator;
    a first lens;
    a scanner;
    a second lens comprising a reflective surface;
    wherein:
        the spatial light modulator is configured to emit light toward the first lens;
        the first lens is configured or imaged to revolve around a primary axis;
        the scanner comprises a reflective surface and is oriented to redirect the light toward the second lens; and
        the spatial light modulator is configured to revolve or rotate around the primary axis; and in conjunction with the revolving movement of the first lens.

2. The system of claim 1, wherein the spatial light modulator is configured to emit light directly toward the first lens.

3. The system of claim 1, wherein the spatial light modulator is configured to emit light indirectly toward the first lens.

4. The system of claim 3, wherein the spatial light modulator is configured to emit light toward a rotating mirror, which redirects the light toward the first lens.

5. The system of claim 1, wherein the scanner is substantially located at a Fourier plane for the first lens and substantially located at a Fourier plane for the second lens.

6. The system of claim 1, wherein:
the scanner is oriented to redirect incoming horizontal light upward toward the second lens; and
the second lens is oriented to redirect upward light from the second lens horizontally toward a viewpoint.

7. The system of claim 6, wherein the viewpoint is one or more eyes of a viewer.

8. The system of claim 1, wherein the scanner comprises large non-revolving galvanometric mirrors.

9. The system of claim 1, further comprising a feedback system configured to receive mirror alignment information and to adjust the mirrors ensure that they are always aligned when they pass through the active portion of the display.

10. The system of claim 9, wherein the second lens is substantially conical, ellipsoidal, or parabolic.

11. The system of claim 1, further comprising a viewpoint stabilizer for fixing a user's eyes at a view elevation.

12. The system of claim 11, wherein the viewpoint stabilizer is a chair.

13. The system of claim 1, further comprising optics between the first lens and the scanner.

14. A scanned aperture holographic video system, comprising:
a spatial light modulator;
a first lens;
a scanner;
a second lens comprising a reflective surface;
wherein:
the spatial light modulator is configured to emit light toward the first lens;
the first lens is configured or imaged to revolve around a primary axis;
the scanner comprises a reflective surface and is oriented to redirect the light toward the second lens;
the scanner comprises a regular polygon;
the regular polygon is centered on the primary axis;
two or more of the interior surfaces of the sides of the regular polygon comprise a reflective area; and
the regular polygon is configured to rotate around the primary axis.

15. The system of claim 14, wherein the reflective areas on the interior surfaces of the sides of the regular polygon are mirrors.

16. The system of claim 14, wherein the scanner is configured to de-scan an image.

17. A scanned aperture holographic video system, comprising:
a spatial light modulator;
a first lens;
a scanner;
a second lens comprising a reflective surface;
wherein:
the spatial light modulator is configured to emit light toward the first lens;
the first lens is configured or imaged to revolve around a primary axis;
the scanner comprises a reflective surface and is oriented to redirect the light toward the second lens; and
the second lens is shaped to have a substantially circular cross section perpendicular to the principal axis.

18. The system of claim 17, wherein the second lens is spherical.

19. The system of claim 17, wherein the first lens is configured to revolve around the primary axis by tracking the rotation of the user rotation platform.

20. A scanned aperture holographic video system, comprising:
a spatial light modulator;
a first lens;
a scanner;
a second lens comprising a reflective surface; and
a user rotation platform;
wherein:
the spatial light modulator is configured to emit light toward the first lens;
the first lens is configured or imaged to revolve around a primary axis;
the scanner comprises a reflective surface and is oriented to redirect the light toward the second lens; and
the user rotation platform is configured to rotate around the primary axis.

* * * * *